United States Patent Office 3,192,236
Patented June 29, 1965

3,192,236
POLYMERIC CHELATES OF HYDROXY-SUBSTITUTED ANTHRAQUINONES AND THE PROCESS FOR THEIR PREPARATION
John J. O'Connell, Waltham, Mass., assignor, by mesne assignments, to Monsanto Research Corporation, Everett, Mass., a corporation of Delaware
No Drawing. Filed July 15, 1960, Ser. No. 42,993
3 Claims. (Cl. 260—366)

This invention relates to metallo-organic coordination compounds. More particularly, this invention relates to methods for preparing polymeric chelates of hydroxy-substituted anthraquinones and said polymeric chelates as new compounds.

It is known that some organic compounds, termed ligands, are capable of forming chelate compounds when coordinated with suitable metal ions. However, it is difficult to form chelate compounds because in many instances, metal salts instead of chelate compounds are produced. It is even more difficult to form polymer chelate compounds by chelation of suitable monomeric ligands with metal ions.

An object of this invention is to provide a new class of polymeric chelates of hydroxy-substituted anthraquinones.

Another object of this invention is to provide high molecular weight polymeric chelates of hydroxy-substituted anthraquinones.

Another object of this invention is to provide a method for producing polymeric chelates of hydroxy-substituted anthraquinones.

Another object of this invention is to provide a method for chelating monomeric ligands to form high molecular weight chelate polymers.

Other aspects, objects and advantages of this invention will be apparent from a consideration of the accompanying disclosure and the appended claims.

According to the present invention, polymeric chelates of hydroxy-substituted anthraquinones are prepared by reacting a hydroxy-substituted anthraquinone with a metal cation having a principal valence of 2 and a coordination number of 4, as illustrated by the following equation with 1,5-dihydroxy anthraquinone:

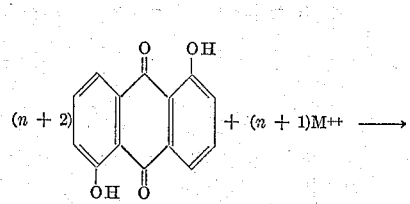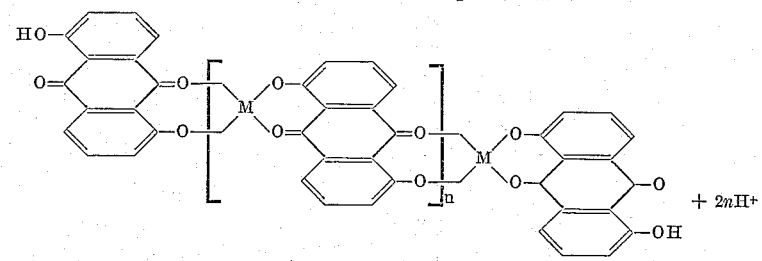

wherein M is a metal cation having a valence of 2 and a coordination number of 4 and $n$ is an integer of from 1 to 3000.

Also, according to the present invention, there are provided, as new compositions, polymeric chelates of hydroxy-substituted anthraquinones selected from the group consisting of

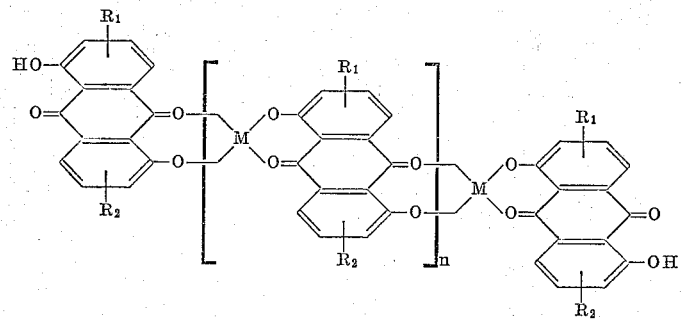

and

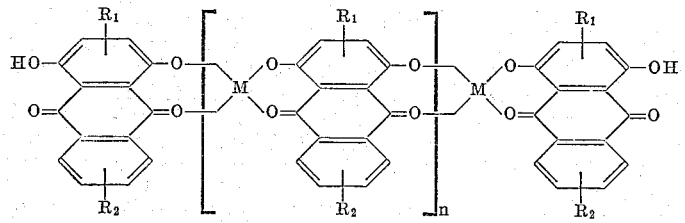

wherein M is a metal cation having a valence of 2 and a coordination number of 4, $n$ is an integer of from 1 to 3000, and $R_1$ and $R_2$ are selected from the group consisting of hydrogen and hydroxyl groups, each said $R_1$ and $R_2$ being either the same or different.

A particular feature of this invention is the discovery that a hydroxy-substituted anthraquinone polymeric chelate of high molecular weight can be produced by regulating the hydrogen ion concentration of the reaction medium to obtain the hydroxy-substituted anthraquinone as a doubly ionized ligand prior to interaction with the metal cation to form the chelate polymer. The degree of ionization of the ligand is readily determined from a potentiometric titration curve of the anthraquinone reactant. This invention is not limited to using a hydroxy-substituted anthraquinone in the form of a doubly ionized ligand, snice this form of anthraquinone is preferred only for effecting the formation of very high molecular weight polymer, and hydroxy-susbtituted anthraquinones in the form of an un-ionized ligand as well as in the form of either a singly ionized ligand or a doubly ionized ligand in the presence of excess base can also be used.

The anthraquinone ligands useful in the present invention as reactants in the formation of high molecular weight polymers can be any of the 9,10-anthraquinones having only one hydroxyl group susbtituted on each of the two α-carbon atoms adjacent each carbonyl group. In addition, the antraquinones which are useful in the present invention can also be substituted with either one or two additional hydroxyl groups on the remaining four β-carbon atoms of the anthraquinone. Thus, the useful anthraquinones can be substituted with from two to four hydroxyl groups but at least one hydroxyl group must be adjacent each carbonyl group and both α-carbon atoms adjacent a carbonyl carbon atoms cannot be so substituted, as shown in the following structural formula

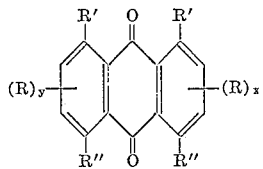

wherein R is selected from the group consisting of hydrogen and hydroxyl, $x$ and $y$ are integers of 1 and 2, the total of $x$ and $y$ being not greater than 2 when R is hydroxyl, and R' and R'' are selected from the group consisting of hydrogen and hydroxyl, only one of said R' and only one of said R'' being hydroxyl and the remainder of said R' and R'' being hydrogen.

The anthraquinone ligands useful in this invention are commercially available compounds which are often used as mordant type dyes in the textile industry. Examples of some of the anthraquinone ligands which can be used in this invention are as follows:

1,4-dihydroxy anthraquinone
1,5-dihydroxy anthraquinone
1,2,4-trihydroxy anthraquinone
1,2,5-trihydroxy anthraquinone
1,4,6-trihydroxy anthraquinone
1,3,5-trihydroxy anthraquinone
1,3,5,7-tetrahydroxyanthraquinone
1,3,4,7-tetrahydroxy anthraquinone
1,3,4,6-tetrahydroxy anthraquinone The chelate-forming metal ions which are useful in forming the novel polymers of this invention may be any metal ion having a principal valence of 2 and a coordination number of 4. Examples of such metal ions include beryllium, copper, nickel, zinc, cobaltous cobalt, ferrous iron, palladous palladium, manganous manganese, calcium, strontium, barium, and cadmium. These metals are used in the form of compounds, but the character of the anionic portion of the compound is ordinarily of little importance so long as it is not tightly associated with water. Examples of some suitable anions include the halides, such as chloride, bromide, or iodide, nitrates, sulfates, and acetates. In order to form high molecular weight polymer, it is desirable that the metal compound be in an anhydrous form substantially free from association with water, including water of crystallization. Therefore, the metal hydroxides are not generally useful in this invention to form the high molecular weight polymers but they may be used. Also, it is desirable that the metal compound be at least partially soluble in the reaction medium.

While the process of this invention is particularly directed to the preparation of polymeric chelates of single metals, it is also contemplated that mixtures of salts of different metals be used to prepare mixed chelate polymer compositions.

The chelation process of this invention is readily carried out at room temperature although elevated temperatures are sometimes used in order to effect solution of the anthraquinone ligand in the inert reaction medium. Also, the electrodes of the potentiometric titration apparatus, if one is used to determine the degree of ionization of the anthraquinone ligand, are more sensitive at somewhat elevated temperatures. In any event, the chelation is usually conducted at any temperature less than 100° C. and ordinarily less than 80° C.

Although the chelation process can be carried out at an elevated pressure, which would also permit a higher temperature to be used, the chelation is usually effected at atmospheric pressure. Thus, there is ordinarily no real advantage in using an elevated pressure to effect the chelation reaction.

The chelation process of this invention must be carried out in an inert reaction medium or solvent which is substantially free of water, including water of crystallization and also hydroxy ions if high molecular weight polymers are desired; however, chelation polymerization can be effected in the presence of water and hydroxyl ions to form lower molecular weight polymers. Therefore, the presence of water in the chelation reaction medium is undesirable since water acts to limit the growth of the polymer chain and results in the formation of aqua complexes instead of high molecular weight chelate polymers. Free hydroxyl ions in the reaction medium operate in the same manner to prevent the formation of the desired high molecular weight polymeric chelate. The inert reaction medium or solvent can be any suitable solvent which, preferably, is highly polar in nature and in which the anthraquinone ligand is at least partially soluble. The extent of solubility of the anthraquinone ligand in the inert reaction medium is dependent to some extent upon the degree of ionization of the ligand. Therefore, in order to form very high molecular weight chelate polymers it is necessary that the doubly ionized ligand be soluble in the inert reaction medium even though the un-ionized or singly ionized ligand is only slightly soluble therein. Examples of some suitable inert reaction mediums include dimethylformamide, acetylnitrile, methanol, ethanol, pyridine, dioxane, and the like. If desired, these solvents can be used in admixture with one another and, in fact, it is sometimes preferred to admix a small amount of either methanol or ethanol with one of the other solvents in order to improve the solubility of the metal cations in the inert reaction medium.

The metal in the anthraquinone ligand can be chelated using an un-ionized ligand; however, it is preferred that the chelation be conducted using an ionized ligand in order to obtain polymer having a high molecular weight. Therefore, in a preferred embodiment of this invention, the hydrogen ion concentration in the reaction medium is carefully regulated to obtain a ligand having a desired state of ionization. The extent of ionization of the ligand is controlled by the addition of alkali to a solution of the anthraquinone ligand in the inert reaction medium. Preferably, for the formation of high molecular weight polymer, the alkali is anhydrous and free of hydroxyl ion; for example, an alkali metal ethoxide, such as sodium ethoxide, potassium ethoxide, and lithium ethoxide; an alkali metal methoxide, or an alkali metal hydride, such as sodium hydride, potassium hydride and lithium hydride. Where lower molecular weight polymers are wanted, the alkali may be an alkali metal or alkaline earth metal hydroxide such as, for example, calcium hydroxide, potassium hydroxide, barium hydroxide, sodium hydroxide and the like.

The extent of ionization of the anthraquinone ligand is very readily determined by measuring the hydrogen ion concentration of a solution of the ligand in the inert reaction medium for each incremental addition of alkali and plotting a standard potentiometric titration curve wherein the millivolt reading is plotted against the amount of alkali needed. Each state of ionization of the ligand is indicated on the titration curve by an inflection point. Thus, a doubly ionized anthraquinone ligand is obtained at the second inflection point. Preferably, for the formation of high molecular weight polymer, the hydrogen ion concentration of the reaction medium is one which corresponds to a doubly ionized ligand molecule.

In this invention, the metal and the hydroxy-substituted anthraquinone ligands can be reacted in various proportions to give the desired chelate products. It is preferred to use approximately stoichiometric amounts of the metal and the hydroxy-substituted anthraquinone to produce the chelate polymer of the desired molecular weight. The presence of an excess of the metal in the inert reaction medium is ordinarily not detrimental to the formation of the chelate polymer; however, the presence of a substantial excess of the anthraquinone ligand tends to retard the formation of the metal chelate, and therefore, prevent the formation of high molecular weight chelate polymers. The amount of alkali necessary to obtain the anthraquinone ligand in the desired state of ionization is measured by potentiometric titration.

The advantages, desirability and usefulness of this invention are illustrated by the following examples.

EXAMPLE 1

In this example, chelate polymers of 1,4-dihydroxy anthraquinone and various divalent metals were prepared. In these preparations, a mixture of 5.0 g. (0.021 mole) of 1,4-dihydroxy anthraquinone obtained from Eastman Organic Chemicals Company and 300 ml. of 95% ethanol was heated for each preparation at reflux temperature for a period of 15 minutes or until most of the material was in solution. Thereafter, 5.0 g. (0.021 mole) of nickelous acetate tetrahydrate in a 75/25 ethanol-water solution was added slowly to the anthraquinone solution. After the addition of the metal was complete in approximately 30 minutes, 1.6 g. (0.04 mole) of sodium hydroxide in 20 ml. of water was added and the mixture refluxed for approximately 1 hour. At the end of this time, the reaction mixture was cooled to room temperature and the precipitated chelate filtered with suction and air dried. Thereafter, the chelate was washed with three 100-ml. portions of water, three 100-ml. portions of 95% ethanol, and three 100-ml. portions of benzene. The washed material was then extracted with chloroform in a Soxhlet apparatus for 4 hours. The extracted chelate was dried at 80° C. under vacuum for 4 hours.

The analytical and thermal data for these various chelate polymers are given in Table 1. The melting or decomposition temperature of the metal chelate polymers was determined using a Fisher-Johns melting point apparatus equipped with a 0–400° thermometer. A small sample of the material was put in between glass slides and observed through a magnifying lens. The decomposition point was taken as the temperature at which the first sign of discoloration or decomposition became apparent. The calculated amounts of metal stated in Table 1 are based upon a polymer of infinite length. The apparent molecular weights were calculated from the amount of the metal in the polymer.

*Table 1*

ANALYTICAL AND THERMAL DATA FOR CHELATE POLYMERS OF 1,4-DIHYDROXY ANTHRAQUINONE

| Metal | Decomposition Point, °C. | Metal Analysis | | Apparent Molecular Wt. | Approximate Degree of Polymerization | Yield, Percent |
|---|---|---|---|---|---|---|
| | | Calc'd [1] | Found | | | |
| Nickel | 380 | 19.8 | 17.2 | 2,000 | 7 | 81 |
| Copper | 375 | 20.8 | 18.5 | 2,000 | 7 | 83 |
| Cobalt | 370 | 19.8 | 16.3 | 1,500 | 5 | 50 |
| Zinc | 390 | 21.7 | 19.9 | 3,100 | 10 | 78 |

[1] Based on a polymer of infinite length.

EXAMPLE 2

In this example, the divalent nickel and copper chelate polymers of 1,5-dihydroxy anthraquinone were prepared by following the same procedure described in Example 1 except that the solvent was dioxane instead of 95% ethanol and the anthraquinone was 1,5-substituted instead of 1,4-substituted. The nickel chelate polymer of 1,5-dihydroxy anthraquinone was obtained in an 86% yield and found to have a decomposition point of 370° C. whereas the copper chelate polymer of 1,5-dihydroxy anthraquinone was obtained in 89% yield and found to have a decomposition point of 365° C.

EXAMPLE 3

In this example, a mixture of 3.3 g. (0.02 mole) of 1,3,5,7-tetrahydroxy anthraquinone and 400 ml. of N,N-dimethylformamide was heated to a temperature of 55° C. and an antimony-glass electrode pair placed in this heated solution and connected to a Beckman pH meter model H–2. A solution of 1.5 g. (greater than 0.242 mole) of sodium methoxide in 80 ml. of anhydrous methanol was then added in 5 ml. increments and the potentiometer read after each addition. The addition of sodium methoxide was continued until the second large inflection point on the titration curve was noted after the addition of 70 ml. of the sodium methoxide solution. At this point, the electrodes were removed from the solution and 1.65 g. (0.0121 mole) of zinc chloride in 50 ml. of methanol added to the reaction mixture. The reaction mixture was then heated at 55° C. for a period of 1 hour with the removal of the alcohol by distillation and the attainment of a pot temperature of 155° C. The material was then refluxed at 155° C. for a period of 3 hours. After cooling to room temperature, the reaction mass was diluted with a large volume of water and precipitated. The powdery chelate polymer was recovered by filtration and vacuum dried at 100° C. for 4 hours. This chelate polymer was found to have a zinc content of 19.1% as compared with a calculated value for an infinite polymer of 19.45%.

The product of the chelation reaction of this invention is a polymeric chelate having at least 2 metal atoms and at least 3 anthraquinone molecules arranged in one of two general types of formulas, depending upon which type of anthraquinone ligand is used. Thus, the product is a linear type polymer of the structure

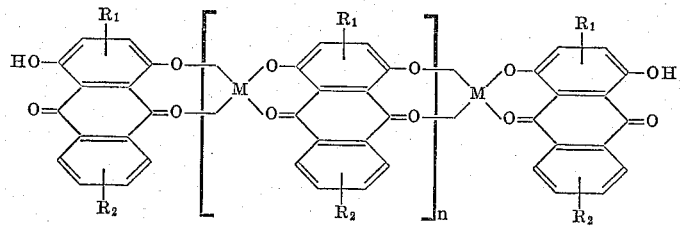

when made from a ligand such as 1,4-dihydroxy anthraquinone, whereas the product is an angular type polymer of the formula

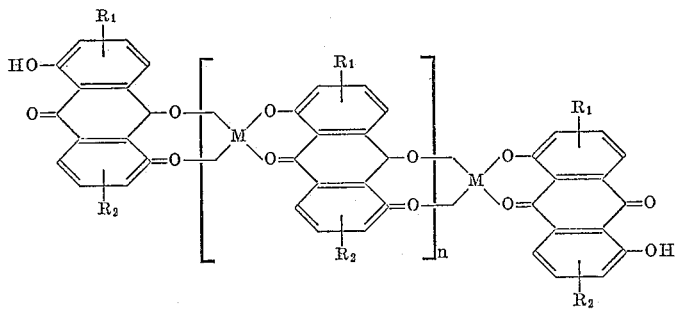

when the product is made from a ligand such as 1,5-dihydroxy anthraquinone. The molecular weights of these polymers can be as low as approximately 300 where $n$, the degree of polymerization is 1, and as high as approximately 100,000, or higher where the degree of polymerization is approximately 3000 or higher. As noted above, the degree of polymerization, and thus the molecular weight, is dependent not only upon the particular ligand used but also upon the presence or absence of free hydroxyl ions and water in the chelation reaction medium. In addition, the degree of polymerization is also somewhat dependent upon the particular nature of the solvent or inert reaction medium used.

The chelate polymers of this invention are characterized as being deeply colored, high melting, powdery, highly crystalline polymers which are insoluble in most organic solvents. In general, these chelate polymers do not have a melting point and decompose only at temperatures above approximately 360° C. Although these chelate polymers are slightly soluble in pyridine, they are less soluble in dimethyl formamide and substantially insoluble in ethanol and other organic solvents.

The high heat stability and color of the chelate polymers of this invention make these polymers particularly useful for incorporation in other polymeric materials as pigments for coloring. For example, the weather resistance of colored polyvinyl acetate, polyamides, polyvinylidene chloro-fluorides and styrene-acrylonitrile copolymers can be improved by the use of a chelate polymer pigment of this invention. The light absorbing characteristics of these chelates also make their use as ultraviolet light stabilizers important. The incorporation of chelate polymers of this invention in a light sensitive material would improve its resistance to ultraviolet degradation.

Reasonable variation and modification of the invention as described are possible, the essence of which is that there have been provided (1) a method for producing polymeric chelates by reacting a hydroxy-substituted anthraquinone with a metal having a principal valence of 2 and a coordination number of 4, and (2) new polymer compositions comprising the chelates of hydroxy-substituted anthraquinones and a metal having a principal valence of 2 and a coordination number of 4.

I claim:
1. The process which comprises (1) treating an anthraquinone derivative of the group consisting of anthrarufin, quinizarin and a β-hydroxy derivative thereof containing 1–2 hydroxy groups with a member of the group consisting of an alkali metal ethoxide, an alkali metal methoxide and an alkali metal hydride in a substantially inert hydroxy-free organic solvent to form a doubly ionized ligand of said anthraquinone derivative, (2) adding to the resulting solution a soluble, substantially anhydrous hydroxy-free metal salt wherein the cation is a metal having a principal valence of 2 and a coordination number of 4, and (3) heating the resulting mixture to give a high-molecular weight chelate condensation polymer.

2. The process which comprises treating 1,3,5,7-tetrahydroxyanthraquinone with alkali metal methoxide in N,N-dimethylformamide to form a doubly ionized ligand of said anthraquinone compound, and heating the resulting reaction mixture with zinc chloride to give a high molecular weight chelate condensation polymer which precipitates from water.

3. The polymer produced by the process defined in claim 2.

References Cited by the Examiner
UNITED STATES PATENTS
2,395,866    3/46   Gutzeit _____ 260—366 XR OTHER REFERENCES
Korshak et al.: "Vysokomolekulyarnye Soedineniya," vol. 2, No. 4, April 1960, pp. 492–497.

LORRAINE A. WEINBERGER,
    Acting Primary Examiner.
CHARLES B. PARKER, LEON ZITVER, Examiners.